United States Patent

Hettinga

[11] Patent Number: 6,129,870
[45] Date of Patent: *Oct. 10, 2000

[54] METHOD FOR CONTROLLING SKIN THICKNESS OF PLASTIC ARTICLE MADE WITH CONTROLLED DENSITY

[76] Inventor: Siebolt Hettinga, 2123 NW. 111th St., Des Moines, Iowa 50325

[ * ] Notice: This patent issued on a continued prosecution application filed under 37 CFR 1.53(d), and is subject to the twenty year patent term provisions of 35 U.S.C. 154(a)(2).

[21] Appl. No.: 08/995,051

[22] Filed: Oct. 16, 1997

Related U.S. Application Data

[63] Continuation of application No. 08/535,485, Sep. 28, 1995, abandoned.

[51] Int. Cl.[7] ............................. B29C 44/06; B29C 44/12
[52] U.S. Cl. ..................... 264/40.5; 264/40.6; 264/45.5; 264/46.4; 264/54
[58] Field of Search ................ 264/40.5, 46.4, 264/45.5, 328.7, 40.6, 54

[56] References Cited

U.S. PATENT DOCUMENTS

| | | | |
|---|---|---|---|
| 3,767,742 | 10/1973 | Robin | 264/328.7 |
| 3,793,415 | 2/1974 | Smith | 264/328.7 |
| 3,809,733 | 5/1974 | Sandiford et al. | 264/328.7 |
| 4,031,176 | 6/1977 | Molbert | 264/45.5 |
| 4,092,385 | 5/1978 | Balevski et al. | 264/45.5 |
| 4,096,218 | 6/1978 | Yasuike et al. . | |
| 4,133,858 | 1/1979 | Hayakawa et al. | 264/54 |
| 4,154,784 | 5/1979 | Ruhl | 264/45.5 |
| 4,729,863 | 3/1988 | Muller et al. . | |
| 4,745,541 | 5/1988 | Vaniglia et al. . | |
| 4,774,675 | 9/1988 | Kagawa . | |
| 4,802,097 | 1/1989 | Tanaka et al. . | |
| 4,805,112 | 2/1989 | Neko . | |
| 4,816,196 | 3/1989 | Otake . | |
| 4,823,274 | 4/1989 | Kiya et al. . | |
| 4,837,490 | 6/1989 | Neko . | |
| 4,847,779 | 7/1989 | Masao et al. . | |
| 4,849,143 | 7/1989 | Langecker . | |
| 4,849,678 | 7/1989 | Kamiguchi et al. . | |
| 5,005,116 | 4/1991 | Fujita et al. . | |
| 5,012,426 | 4/1991 | Harada et al. . | |
| 5,016,184 | 5/1991 | Gutjahr . | |
| 5,031,108 | 7/1991 | Fujita et al. . | |

(List continued on next page.)

FOREIGN PATENT DOCUMENTS

| | | |
|---|---|---|
| 0035916 | 9/1981 | European Pat. Off. . |
| 0480456 | 4/1992 | European Pat. Off. . |
| 1268819 | 5/1968 | Germany . |
| 039425 | 3/1983 | Japan . |
| 068209 | 4/1986 | Japan . |
| 2 070 290 | 9/1981 | United Kingdom ............. 264/40.6 |
| 9218561 | 10/1992 | WIPO . |

OTHER PUBLICATIONS

Japanese Abstract, Publ. #JP 57069024, Publ. Date—Apr. 27, 1982.
Japanese Abstract, Publ. #JP 56005743, Publ. Date—Jan. 21, 1981.

*Primary Examiner*—Allan R. Kuhns
*Attorney, Agent, or Firm*—Brian J. Laurenzo; Michael C. Gilchrist

[57] ABSTRACT

A method of molding a plastic with a foamed interior and a dense outer skin of a desired thickness, whereby a blowing agent is mixed with a plastic material and the mixture is injected, under pressure, into a mold cavity of a mold unit. The mixture is allowed to cool along the molding surfaces of the mold cavity for a determined amount of time. The pressure is released and the mold cavity expanded to allow the blowing agent to foam the interior of the plastic article. The molding cavity is then compressed to achieve the desired dimensions for the plastic article, and to give the interior a uniform cellular structure. Control over the timing of the expansion of the mold cavity, the injection temperature, the rate of injection of the mixture, the rate at which the cavity is expanded and compressed, and the timing of the compression of the mold cavity allow a skin of desired thickness to be formed on the plastic article.

16 Claims, 7 Drawing Sheets

U.S. PATENT DOCUMENTS

| | | |
|---|---|---|
| 5,031,127 | 7/1991 | Fujita et al. . |
| 5,062,052 | 10/1991 | Sparer et al. . |
| 5,062,053 | 10/1991 | Shirai et al. . |
| 5,095,419 | 3/1992 | Seki et al. . |
| 5,097,431 | 3/1992 | Harada et al. . |
| 5,097,432 | 3/1992 | Harada et al. . |
| 5,130,075 | 7/1992 | Hara et al. .......................... 264/328.7 |
| 5,252,269 | 10/1993 | Hara et al. ............................ 264/45.5 |
| 5,281,376 | 1/1994 | Hara et al. ............................ 264/46.4 |
| 5,292,465 | 3/1994 | Kobayashi et al. ................... 264/45.5 |
| 5,336,463 | 8/1994 | Hara et al. . |
| 5,437,823 | 8/1995 | Hettinga et al. ...................... 264/45.5 |

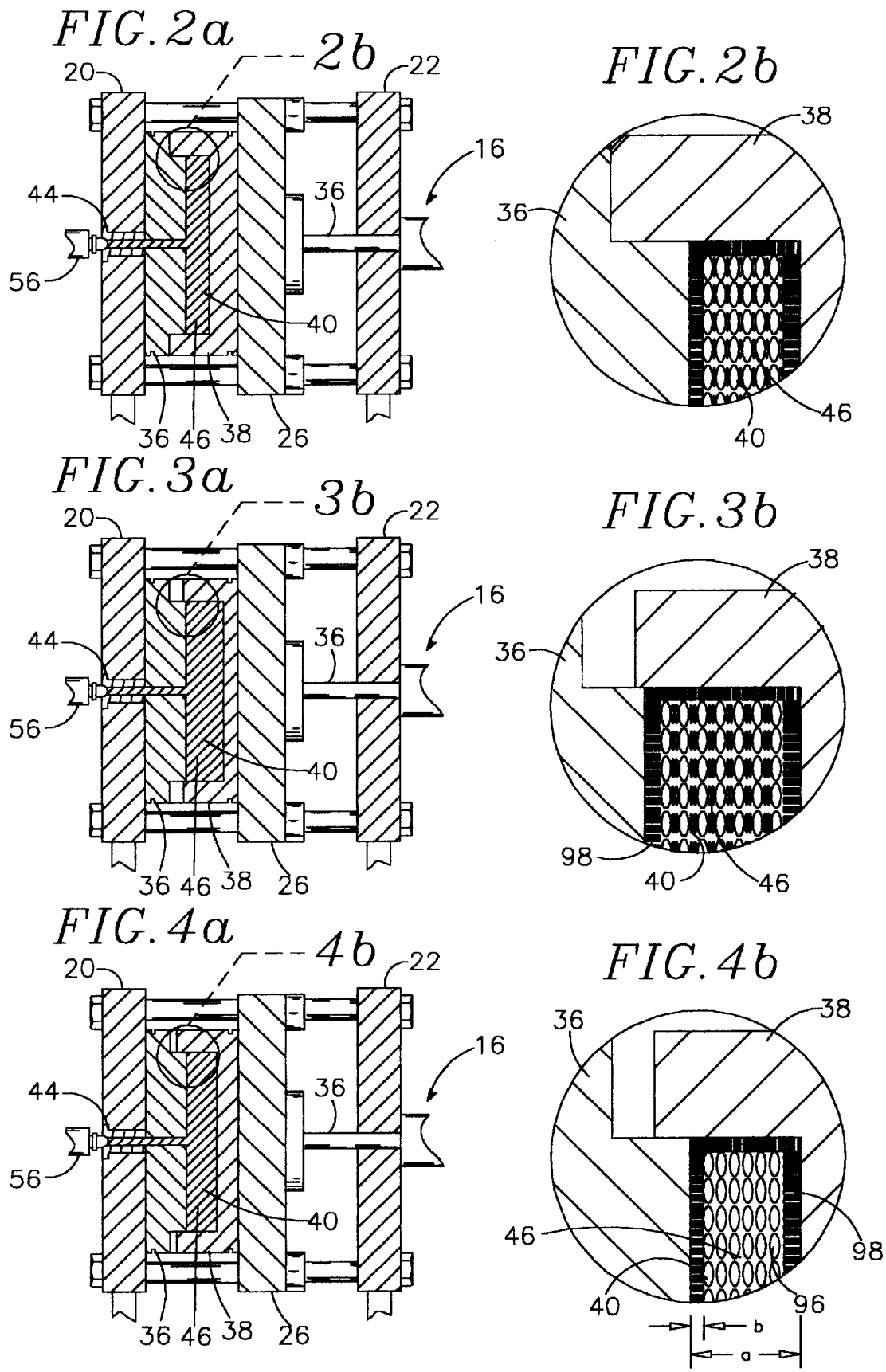

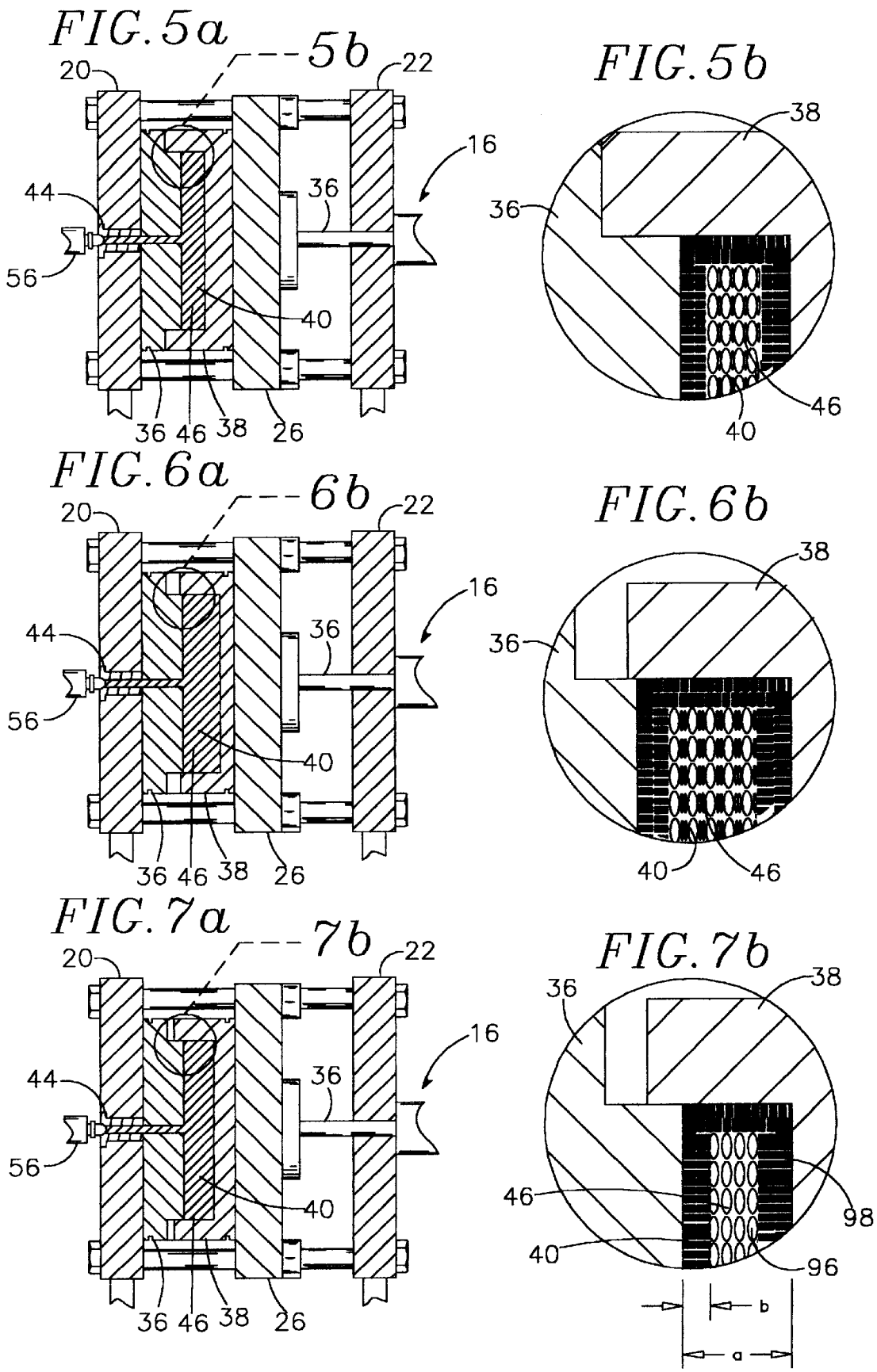

METHOD FOR CONTROLLING SKIN THICKNESS OF PLASTIC ARTICLE MADE WITH CONTROLLED DENSITY

This application is a continuation application of Ser. No. 08/535,485, filed Sep. 28, 1995, now abandoned.

BACKGROUND OF THE INVENTION

The invention relates to a method for molding a plastic article of a desired density, and more particularly, to a method for molding a plastic article with a foamed interior and a smooth dense outer skin of a desired thickness.

Plastic injection molding machines generally include a two section mold unit wherein one of the mold sections is stationary and includes an end opening for the injection of mold material into a cavity. The other mold section is generally movable between an open position away from the stationary mold section and a closed position wherein the two mold sections are in sealed engagement to form a mold cavity.

Once the mold cavity has been formed, a screw or similar injection device is used to inject a plastic material into the mold cavity where the material is cured under pressure. It is well known in the prior art to combine a blowing agent with the plastic material to decrease the density of the finished plastic part.

Injection molding provides efficient means for producing plastic articles both quickly and economically. It is often desired to create a plastic article of a decreased density, as the decreased density reduces the amount of material needed to create an article of a given dimension, and also reduces the weight of an article of a desired dimension. One way of reducing the density of the plastic article is to combine a blowing agent with the plastic material. Most blowing agents are heat-activated, and produce bubbles, or foam, within the plastic when activated. If the blowing agent is distributed evenly throughout the plastic material, the bubbles produced by the blowing agent will generally be evenly distributed throughout the plastic material after the blowing agent is activated. As the plastic material cools and hardens, these bubbles form a cellular structure throughout the plastic article.

Although it is desirable to have this cellular structure within a plastic article, it is desirable to have a more dense outer skin that is free from the cellular structure created by the blowing agent. This outer shell gives the plastic article a more aesthetic appearance and a tougher covering.

It has been shown in U.S. Pat. No. 5,437,823 how to make a plastic article having a dense unfoamed outer skin and a foamed interior. This is achieved by injecting the plastic material and blowing agent into the mold cavity under a high enough pressure to prevent the blowing agent from forming bubbles. The plastic is maintained at a high pressure while a skin forms along the walls of the mold cavity. The pressure is then decreased, and the blowing agent is allowed to foam the interior of the plastic article.

While it has been shown how to make an article with a dense skin and a foamed interior, the process has not been adjustable to accurately control the thickness of the outer skin in a molded plastic article. It is desirable to control this thickness as it allows articles of a precise weight, dimension, density, and strength to be produced. Being able to accurately control the skin thickness is also valuable in creating an angled plastic article made from a single flat sheet of a plastic article, as it allows precise control of the bending radius of the outer shell. Molding fabric into the surface of a plastic article for support or decoration is also aided by being able to accurately control the skin thickness of a controlled density plastic article having a dense outer skin and a foamed interior.

SUMMARY OF THE INVENTION

Accordingly, it is an object of the present invention to provide a method for molding a controlled density plastic article having a foamed interior and a dense outer skin of a desired thickness. Another object of the present invention is to provide a repeatable process for producing a controlled density plastic article having a foamed interior and a dense outer skin of a desired thickness.

These and other objects of the invention will become apparent upon reference to the following specification, drawings, and claims.

By the present invention, it is proposed to overcome the difficulties encountered heretofore. To this end, a method of molding a plastic article is proposed whereby a first mold section and a second mold section are placed in sealed engagement to form a mold cavity. A blowing agent is mixed with a plastic injection material to form an injection mixture. The injection mixture is heated to an injection temperature above the activation temperature of the blowing agent. The injection mixture is injected into the mold cavity at a controlled injection rate while being pressurized to prevent the blowing agent from reacting. The injection material is allowed to cool against the molding surfaces of the mold cavity. After waiting for a skin-forming interval, the volume of the mold cavity is expanded to allow the blowing agent to be activated. After waiting for a foaming interval, the first mold section and second mold section are then moved together to reduce the volume of the mold cavity to a compression volume. In the preferred embodiment, the rate at which the mold cavity is expanded and compressed is controlled. By use of this method, the thickness of the unfoamed outer-skin can now be controlled.

BRIEF DESCRIPTION OF THE DRAWINGS

FIGS. 2a–b are a side elevational view and close-up of the mold apparatus showing the mold unit in the initial position after an injection material has been injected into the mold cavity, when a relatively thin outer skin is desired;

FIGS. 3a–b are a side elevational view and close-up of the mold apparatus showing the mold unit in the expanded position, when a relatively thin outer skin is desired;

FIGS. 4a–b are a side elevational view and close-up of the mold apparatus showing the mold unit in the compressed position, when a relatively thin outer skin is desired;

FIGS. 5a–b are a side elevational view and close-up of the mold apparatus showing the mold unit in the initial position after an injection material has been injected into the mold cavity, when a relatively thick outer skin is desired;

FIGS. 6a–b are a side elevational view and close-up of the mold apparatus showing the mold unit in the expanded position, when a relatively thick outer skin is desired;

FIGS. 7a–b are a side elevational view and close-up of the mold apparatus showing the mold unit in the compressed position, when a relatively thick outer skin is desired;

DETAILED DESCRIPTION OF THE PREFERRED EMBODIMENTS

Figure 1:
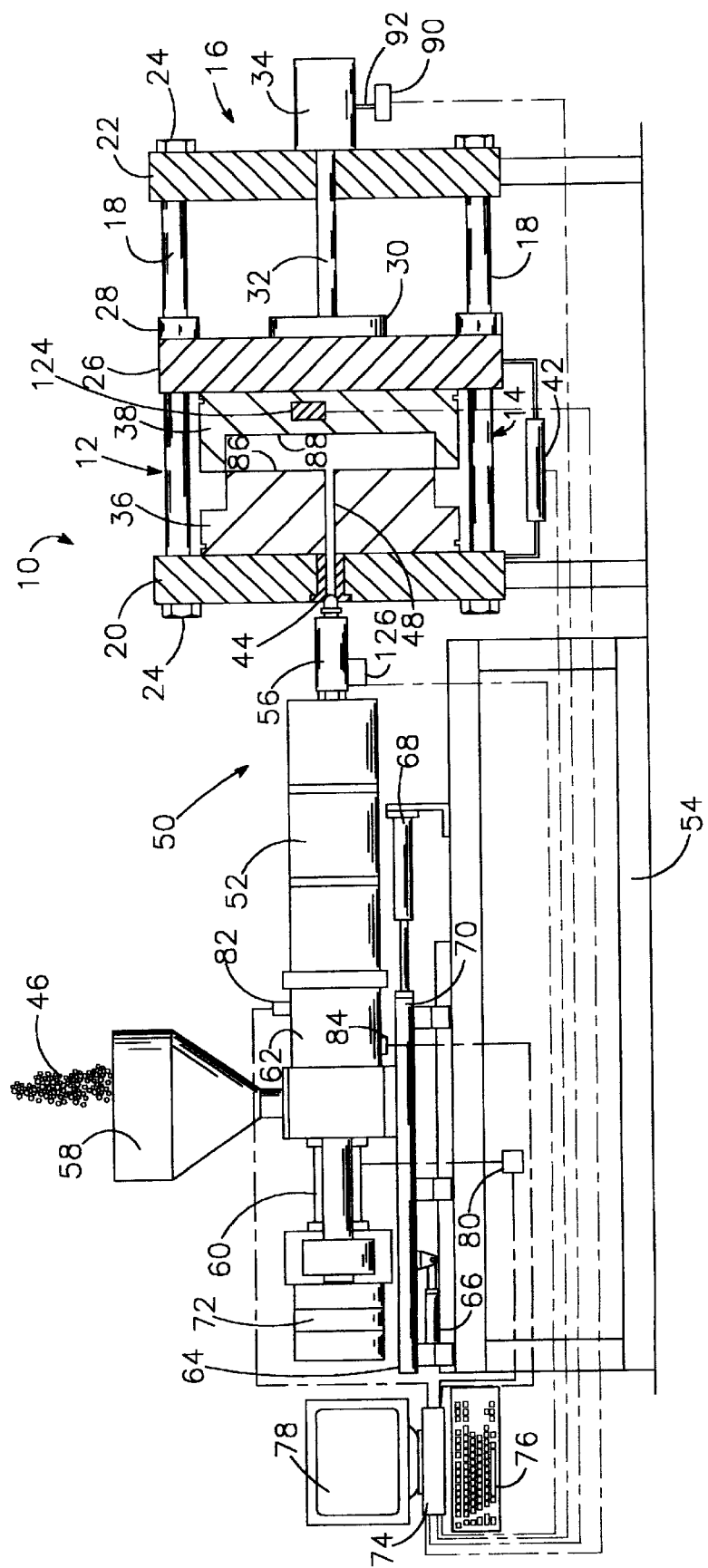
FIG. 1 is a side elevational view of the plastic injection molding machine of the present invention showing the mold unit in the open position.

In the figures, a mold apparatus 10 is shown including a mold unit 12, a mold frame 14, and a hydraulic piston 16 (FIG. 1). The mold frame 14 consists of four cylindrical support bars 18 which are secured to a first plate 20 and a second plate 22 by means of nuts 24. A mold carriage 26 is slideably attached to the support bars 18 through bores which pass through the corners of the mold carriage 26. Support blocks 28 are provided with bores and mounted to the corners of the mold carriage 26 to add extra support to the mold carriage 26 as it slides along the support bars 18. A platen 30 is secured to the mold carriage 26 to evenly distribute force over the mold carriage 26. Secured to the platen 30 is a piston ram 32. The piston ram 32 passes through a bore in the center of the second plate 22 and is connected to a hydraulic cylinder 34. The hydraulic cylinder 34, piston ram 32, traverse valve 92, and variable vane hydraulic pump 90 make up the hydraulic piston 16. The hydraulic piston 16 is in connection with a central processing unit 74, and can be controlled through the central processing unit 74.

A first mold section 36 is mounted to the first plate 20 in alignment with a second mold section 38 which is mounted to the mold carriage 26. As the hydraulic piston 16 pushes the mold carriage 26 toward the first plate 20, the first mold section 36 fits into seated engagement with the second mold section 38 to form a mold cavity 40 therebetween. As shown in FIGS. 2a–b, 3a–b, 4a–b, 5a–b, 6a–b, and 7a–b the volume of the mold cavity 40 may be increased or decreased by moving the second mold section 38 away from or toward the first mold section 36.

A linear actuator 42 is mounted between both the first plate 20 and mold carriage 26 to monitor the distance between these two items to allow calculation of the volume of the mold cavity 40 when the second mold section 38 is placed at various distances relative to the first mold section 36. The linear actuator 42 is in connection with the central processing unit 74 in order to give feedback to the central processing unit 74 as to the position of the first mold section 36 relative to the second mold section 38. It is contemplated that the linear actuator 42 could be located between the second plate 22 and the mold carriage 26, or between any two points that would give feedback as to the position of the first mold section 36 relative to the second mold section 38. A nozzle inlet 44 is located in the center of the first plate 20 to allow an injection mixture 46 to pass into a mold inlet 48 located in the first mold section 36 and thereafter into the mold cavity 40.

Provided for operable engagement with the nozzle inlet 44 is an injection assembly 50 which prepares and injects the injection mixture 46 into the mold cavity 40 (FIG. 1). The injection assembly 50 is provided with an injection barrel 52 supported by a main frame 54. A nozzle unit 56 is mounted at one end of the injection barrel 52 and a hopper 58 is mounted to the top of the injection barrel 52. Positioned coaxially within the injection barrel 52 is a reciprocating screw 60 with attached flights (not shown) for plasticizing and moving the injection mixture 46 toward the injection barrel 52 and nozzle unit 56. A variable volume, pressure compensated hydraulic pump 62 is secured to the injection barrel 52 and operates to move the injection screw 60 relative to the injection barrel 52 during the injection molding process. The injection assembly 50 is provided with a large rotational motor 72 which turn s the injection screw 60 to plasticize the injection mixture 46 before injection.

The nozzle unit 56 is movable into and out of operative association with the nozzle inlet 44 upon a reciprocal movement of a carriage 64 relative to the main frame 54. This reciprocal movement is responsive to the operation of a double acting cylinder 66 pivotally interconnected between the carriage 64 and the main frame 54. The operation of the double acting cylinder 66 is controlled by a second linear actuator 68 mounted on the mainframe 54 for coacting engagement with a limit member 70 on the carriage 64.

The injection assembly 50 is operably coupled t o the central processing unit 74 which monitors the progress of the injection process and feeds back responsive information regarding this progress to the injection assembly 50 (FIG. 1) In the preferred embodiment the central processing unit 74 is a personal computer, but the central processing unit 74 may, of course, be any system capable of receiving user input variables, monitoring the progress of a plastic injection run, and controlling the injection in response thereto. The central processing unit 74 is equipped with an input device 76 and a viewing screen 78. To monitor the rate of injection mixture 46 injection, a shot size transducer 80 is coupled to the injection screw 60 to monitor the distance that the injection screw 60 travels. The shot size transducer 80 is a linear actuator which correlates movement of the injection screw 60 to a predetermined amount of the injection mixture 46 injected into the mold cavity 40. The shot size transducer is connected to the central processing unit 74 in order to give feedback to the central processing unit 74. As each incremental amount of injection mixture 46 within the injection assembly 50 is injected into the mold cavity 40, the shot size transducer 80 monitors the associated incremental movement of the injection screw 60. Preferably the shot size transducer 80 measures increments of injection mixture 46 of one gram or less, which translates into approximately four thousand increments for a typical molding operation.

To monitor the pressure at which the injection mixture 46 is injected into the mold cavity 40, a pressure monitor 82 is operably coupled to the hydraulic pump 62 (FIG. 2). The pressure monitor 82 is also coupled to the central processing unit 74. The central processing unit 74 is operably coupled to an injection control 84 which is, in turn, coupled to the hydraulic pump 62 to manipulate the injection of the injection mixture 46.

To begin the molding process the hydraulic piston 16 is actuated to force the piston ram 32 toward the first plate 20. The platen 30 disburses the force of the piston ram 32 to the mold carriage 26 and the second mold section 38. The second mold section 38 is moved toward the first mold section 36 until a mold cavity 40 of an initial volume is formed. In the preferred embodiment of the present invention, this initial volume of the mold cavity 40 is the volume formed when the second mold section 38 has been moved as far as possible toward the first mold section 36. It should be noted, however, that an infinite number of initial volumes for mold cavity 40 may be chosen, including the case where the mold cavity 40 has no volume until the injection mixture 46 pushes the second mold section 38 away from the first mold section 36.

An injection mixture 46 is prepared by adding a blowing agent to a plastic injection material. Although several blowing agents are known in the art, in the preferred embodiment the blowing agent is azodicarbonamide. Azodicarbonamide decomposes when heated to produce a gas. The ratio of the blowing agent to the plastic injection material is determined by process parameters, part or design, or desired application for the plastic part. In the preferred embodiment of the present invention azodicarbonamide is added to polypropylene at the approximate ratio of one part azodicarbonamide to ninety-nine parts polypropylene to produce the injection mixture 46. Polyurethane, polystyrene, or any other suitable plastic material may be used instead of polypropylene. The injection mixture 46 is heated to an injection temperature and injected into the molding cavity 40. The injection temperature is hot enough to plasticize the injection mixture 46, and hot enough that the blowing agent will decompose, or be activated, unless the injection mixture 46 is pressurized. In the preferred embodiment the injection temperature is approximately 400 degrees Fahrenheit.

Before the injection mixture 46 is injected into the mold cavity 40, it is first plasticized to provide a flowable material which eventually hardens into a finished plastic article 94. The following parameters affect the plasticization process: the type of raw plastic material to be plasticized, throat temperature, the temperature of injection assembly heating zones, the size, length and type of screw 60, the rate at which the screw 60 is turned, and the rate at which the screw 60 is allowed to move back. Of these parameters, only the type of raw plastic material and screw dimensions are not directly controlled by software within the central processing unit 74. The throat temperature and temperature of injection assembly heating zones are controlled by standard proportion integral derivative (PID) control algorithms. The software controls the rate at which the screw 60 is turned so that the rate is directly proportional to the rate of oil produced by a variable vane hydraulic pump. The software directly controls the rate at which the oil is delivered by the hydraulic pump 62 by supplying two set points, a rate set point and a maximum pressure set point. The rate set point specifies the rate of oil flow requested while the maximum pressure set point specifies a maximum pressure limit. Consequently, since pressure is a function of rate of flow times a resistance, the maximum pressure set point will limit the rate of flow in the case when maximum pressure is obtained. Preferably, the rate at which the screw 60 turns during the plasticization process is profiled. Profiling causes the screw 60 to turn at different rates during the plasticization cycle.

The rate at which the screw 60 is allowed to move back is also controlled by software. The profiled turning of the screw 60 during the plasticization process causes the injection mixture 46 to be metered to an area in front of the screw 60. The injection mixture 46 being metered forward causes a counter plastic pressure attempting to force the screw 60 backward. The rate at which the screw 60 moves backward, from the counter pressure of the injection mixture 46 being metered forward, is profiled by software. Profiling of the rate of movement backward allows for variations in the amount of time the injection mixture 46 is mixed by the screw 60, as well as profiling the amount of frictional heat created by the screw 60 turning which is induced into the injection mixture 46. Software specifies this profile by supplying a back pressure set point to a variable hydraulic back pressure valve.

Like the plasticization process, the injection process is also controlled by software. The parameters associated with the injection process include the following: the type of raw injection mixture 46 to be injected; the temperature of the injection mixture 46; the size, length and type of screw 60; the rate at which the injection mixture 46 is injected; the mold design; and the mold temperature. Preferably, both the temperature of the material and the rate at which the injection mixture 46 is injected are controlled by software.

To control the temperature of material as the material enters the mold cavity 40 during injection, or injection temperature; the central processing unit 74 controls several parameters. In a preferred embodiment, the central processing unit 74 receives feedback as to the injection temperature from a temperature sensor 126 near the nozzle inlet 44. The heater bin temperature is manipulated during the plasticization process and frictional heat is controlled during both the plasticization and back pressure cycles. Additionally, frictional heat developed from the injection mixture 46 moving through the injection nozzle during the injection process is controlled to provide the optimum amount of heat into the material based upon the desired resulting plastic article 94. Control of the injection temperature is beneficial in producing plastic articles 94 with the desired skin thickness. If the injection temperature is not accurately controlled, the depth to which the injection mixture cools below the activation temperature of the blowing agent will not be controlled. If the injection temperature is too low, the injection mixture will cool below the activation temperature of the blowing agent to too great a depth, and the skin will be too thick. If the injection temperature is too high, too much of the injection mixture will be above the activation temperature of the blowing agent when the second mold section 38 is moved to the expanded position, and the skin 98 will not be thick enough.

Software allows the rate at which the injection mixture 46 is injected during the inject cycle to be profiled. Profiling causes the injection material 46 to be injected at different rates during the inject cycle. Software specifies this profile by supplying the required rate and maximum pressure set points to the variable vane pump supplying a profile to flow of oil to the cylinders attached to the screw 60. A typical inject profile will begin at a slow inject rate with the pump set to allow for maximum pressure. As the mold cavity 40 fills, the rate proportionally increases to the optimum rate for the filling of the mold cavity 40. When the mold cavity 40 is approximately ninety percent (90%) filled, the maximum pressure set point of the hydraulic pump 62 is lowered to a value which prevents the injection pressure from overcoming the clamp pressure. The remainder of the material is injected into the mold cavity 40 allowing the pressure compensation characteristics of the pump to control the rate at which the material is injected. This type of profiling describes a manner in which the mold cavity 40 is approximately ninety percent (90%) filled using rate control with the last ten percent (10%) using pressure control. This is accomplished by the design of the hydraulic system and control software.

Controlling the injection rate is vital to producing a plastic article 94 with the desired skin thickness. As the injection mixture 46 enters the mold cavity 40 it is cooled by a first molding surface 86, and a second molding surface 88. If the injection mixture 46 is injected too quickly, it will not have sufficiently cooled at the time the expansion step takes place, and the skin 98 will not be thick enough. If the injection mixture 46 is injected too slowly, it will cool too much during the injection process and the skin 98 will be formed too thick.

The temperature of the molding surfaces 86, 88 can affect the thickness of the unfoamed outer skin 98. The cooler the molding surfaces 86, 88 are, the more quickly the injection mixture 46 cools below the blowing agent's activation temperature to a sufficient depth to form the outer skin 98. In the preferred embodiment, the temperature of the mold surfaces is controlled by running several trial shots in order to warm the mold sections 36, 38 to an equilibrium temperature. A cooling means 124 may be added to the either of the molding sections 36, 38 so that the molding surfaces 86, 88 may be cooled to below the activation temperature of the blowing agent (FIG. 1)s. The cooling means 124 may also be used to create a plastic article 94 having a thicker unfoamed outer skin 98 on the side formed near the mold section 38 having the cooling means 124 than on the side formed near the mold section 36 without cooling means.

During the injection process, and for an interval of time after the injection process, the injection mixture is maintained at a high enough pressure that the blowing agent will not be activated. During the injection process, the pressure is maintained by the hydraulic pump 62, the and air pressure in the mold cavity 40 provides back pressure during the filling of the mold cavity 40. After the injection mixture 46 is in the mold cavity 40, the pressure is supplied by the hydraulic piston 16 applying a clamping pressure which tends to urge the second mold section 38 towards the first mold section 36. The pressure must remain high enough to prevent the blowing agent from activating so that bubbles are not introduced into the injection mixture 46 before the portion of the mixture that will form the skin has a chance to cool below the activation temperature of the blowing agent. The activation temperature is the temperature above which the blowing agent will degrade to form bubbles when at or not substantially above atmospheric pressure.

In the preferred embodiment, the second mold section 38 remains stationary during the filling of the mold cavity 40 and during a skin-forming interval while the injection mixture 46 is maintained at a pressure high enough to prevent the blowing agent from being activated. However, it should be known to those of ordinary skill in the art that as long as the pressure remains high enough, the mold sections 36, 38 need not remain stationary; it would be acceptable to allow the second mold section 38 to be moved slightly away from the first mold section 36 by the injection pressure. The length of the skin-forming interval, also known as the first predetermined interval, is the critical element in controlling the skin thickness of the completed plastic article 94. During this interval, heat is removed from the injection mixture 46 through the molding surfaces 86, 88 and into the mold sections 36, 38. The portion of the injection mixture 46 nearest the molding surfaces 86, 88 cools the quickest. As the injection mixture cools 46, the portion nearest the molding surfaces 86, 88 drops below the activation temperature of the blowing agent. The depth of the portion of the injection mixture that cools below the activation temperature of the blowing agent determines the thickness of the skin 98 of the completed plastic article 94. The longer the skin-forming interval, the thicker the skin 98 will be. In a preferred embodiment the skin-forming interval is twelve (12) seconds (FIGS. 2–4). In a second preferred embodiment the skin-forming interval is twenty (20) seconds (FIGS. 5–7). It can be seen that the skin thickness "b" is less in the article 94 formed with a twelve second skin-forming interval (FIG. 4b) than in the article 94 formed with a twenty second skin-forming interval (FIG. 7b).

In the preferred embodiment, there are two ways of precisely controlling the skin-forming interval. The first way is the time delay method. In the time delay method, an operator of the mold apparatus 10 enters a time delay into the central processing unit 74 for how long after all the injection mixture enters the mold cavity 40 before the hydraulic cylinder 34 should begin releasing pressure and pull back the second mold section 38 to the expanded volume position (FIGS. 3a, 6a). The central processing unit 74 will wait for the entered time delay after all the injection mixture 46 has entered the mold cavity 40 before sending a signal to the hydraulic piston 16 to start releasing pressure. The time delay method will be used in the preferred embodiment when the skin-forming interval ranges between five (5) seconds and thirty (30) seconds.

The second way of controlling the skin-forming interval is the injection screw position method. In the injection screw position method, the operator enters into the central processing unit 74 a position of the injection screw 60 which will trigger the hydraulic cylinder 34 to begin releasing pressure. The shot size transducer 80 gives feedback to the central processing unit 74 as to the position of the injection screw 60. When the injection screw 60 reaches the position entered into the central processing unit 74 by the operator, the central processing unit sends a signal to the hydraulic cylinder 34 which causes the hydraulic cylinder 34 to begin releasing pressure so that it can move the second mold section 38 to the expanded volume position (FIGS. 3a, 6a). This method is preferable when the skin-forming interval is short, because it takes time for the pressure to be released by the hydraulic piston 16 before the hydraulic cylinder 34 can be used to move the second mold section 38 to the expanded position. The injection screw method is preferable when the skin-forming interval is between zero (0) and five (5) seconds.

At the end of the skin-forming interval, the second mold section 38 is moved away from the first mold section 36 to an expanded position (FIGS. 3a, 6a). The speed at which the second mold section 38 moves from the initial position (FIGS. 2a, 5a) to the expanded volume position (FIGS. 3a, 6a) is an important factor for getting a uniform plastic part and for accurately controlling the skin thickness. This factor is known as the expansion rate. If the second mold section 38 moves too quickly, the foaming of the blowing agent will not be able to expand the injection mixture quickly enough to remain in contact with the molding surfaces 86, 88 and irregularities will be formed at the surface of the plastic article 94. If the second mold section 38 moves too slowly, the part will continue to cool from the molding surfaces 86, 88 toward the interior of the part, and the portion of the injection mixture nearest the molding surfaces will continue to cool below the activation temperature before the blowing agent has had a chance to fully decompose, forming a thicker skin 98 than desired or an area near the skin that is not completely foamed. The rate at which the second mold section moves away from the first mold section and into the expanded volume position is therefore also controlled by the central processing unit 74. The central processing unit 74 sends a signal to the variable vane hydraulic pump. The variable vane hydraulic pump 90 controls the flow of oil to the hydraulic cylinder 34 through the fine traverse valve 92. The linear actuator 42 gives the central processing unit feedback as to the position of the second mold unit 38. By controlling the flow of oil to the hydraulic cylinder 34 in response to the location of the second mold section 38, the central processing unit is able to control the position of the second mold section 38, and the rate at which it moves between positions. In the preferred embodiment the expansion rate is in the range of fifteen to thirty millimeters per second (15–30 mm/sec.).

The mold cavity 40 may be maintained in the expanded position for a period of time to allow the blowing agent to completely decompose. This period of time is a foaming interval, also known as the second predetermined interval. After the foaming interval, a compression stage is begun wherein the hydraulic piston 16 moves the second mold section 38 toward the first mold section 36. The compression stage allows the plastic article 94 to be formed to a precise dimension. It also serves the further purpose of distributing the gas bubbles formed by the blowing agent evenly throughout the interior of the plastic article 94, giving the foamed portion of the plastic article 94 a uniform cellular structure. In the preferred embodiment the foaming interval is four (4) seconds. It is sometimes necessary that the foaming interval may be decreased to zero (0) seconds; in which case the compression would begin as soon as the second mold section 38 reaches the expanded position (FIGS. 3*a*, 6*a*)

During the compression stage, the second mold section 38 is moved into a compression position (FIGS. 4*a*, 7*a*). This compression position determines the final dimension of the plastic article 94. The speed at which the second mold section is moved from the expanded position to the compression position is the compression rate. In the preferred embodiment, the compression rate is in the range of one to thirty millimeters per second (1–30 mm/sec.)

The injection mixture cools and hardens into the plastic article 94 while the second mold section is in the compression position. It should be apparent to those skilled in the art that the second mold section 38 may actually cycle back and forth around said compression position as the central processing unit 74 corrects for the change in pressure exerted on the hydraulic piston 16 as the injection mixture cools and contracts.

Figure 8:
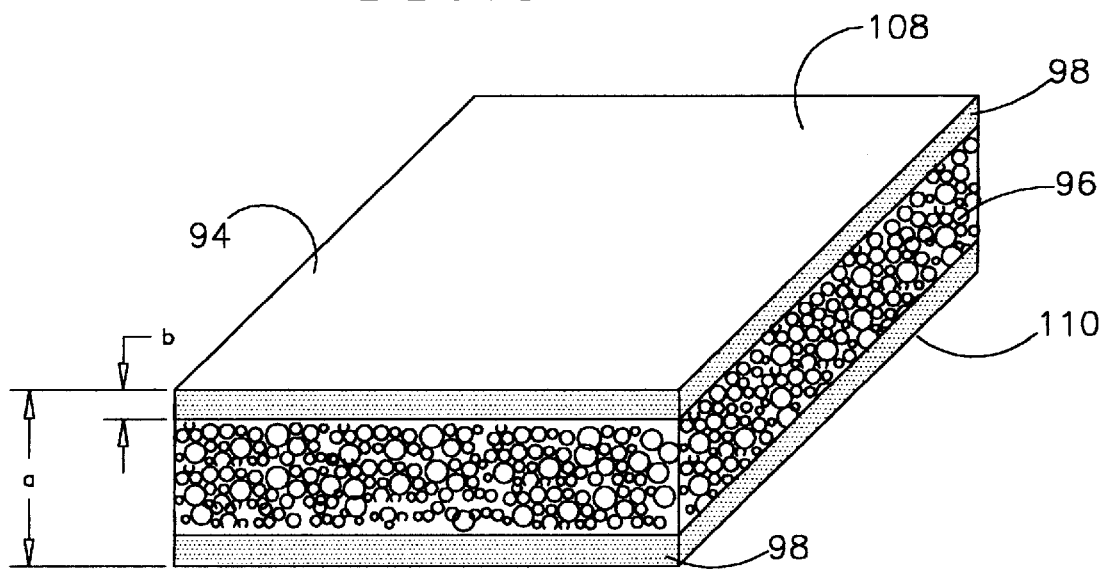
FIG. 8 is a cross-sectional perspective view of a finished plastic article formed by the method.

The injection mixture 46 is allowed to cool and harden into a plastic article 94 having a foamed interior 96 and an unfoamed outer skin 98 of a desired thickness. After the plastic article 94 has sufficiently cooled and hardened, it is removed from the mold cavity 40. The cooling period in the preferred embodiment is between two (2) and ten (10) minutes. A post-molding cooling apparatus can be utilized to speed-up production by cooling the part as soon as it can be ejected from the mold cavity 40. In the cross-sectional perspective view of the plastic article 94 shown in FIG. 8 it can be seen that the dimension "a" corresponds to the thickness of the plastic article 94, and the dimension "b" corresponds to the skin thickness of the unfoamed outer skin 98. In a preferred embodiment dimension "a" is five eighths of an inch (⅝") and "b" is eight-one hundredths (0.08) of an inch (FIG. 4*b*). In a second preferred embodiment "a" is five eighths of an inch (⅝") and "b" is one-tenth (0.1) of an inch (FIG. 7*b*).

In order to form a plastic article 94 with the desired skin thickness, several test runs are conducted. These test runs are used to determine what settings to use for the injection temperature, the injection rate, the skin-forming interval, the rate at which the second mold section 38 is moved to the expanded position, the foaming interval, and the rate at which the second mold section 38 is moved to the compressed position. The setting for each of the above factors and the resulting skin thickness of the plastic article 94 is recorded for each run. When a plastic article 94 of the desired skin thickness is produced, the settings are noted. Thereafter, an identical plastic article 94 can be made by using the same settings. The settings determined in this manner are said to be predetermined.

Figure 9:
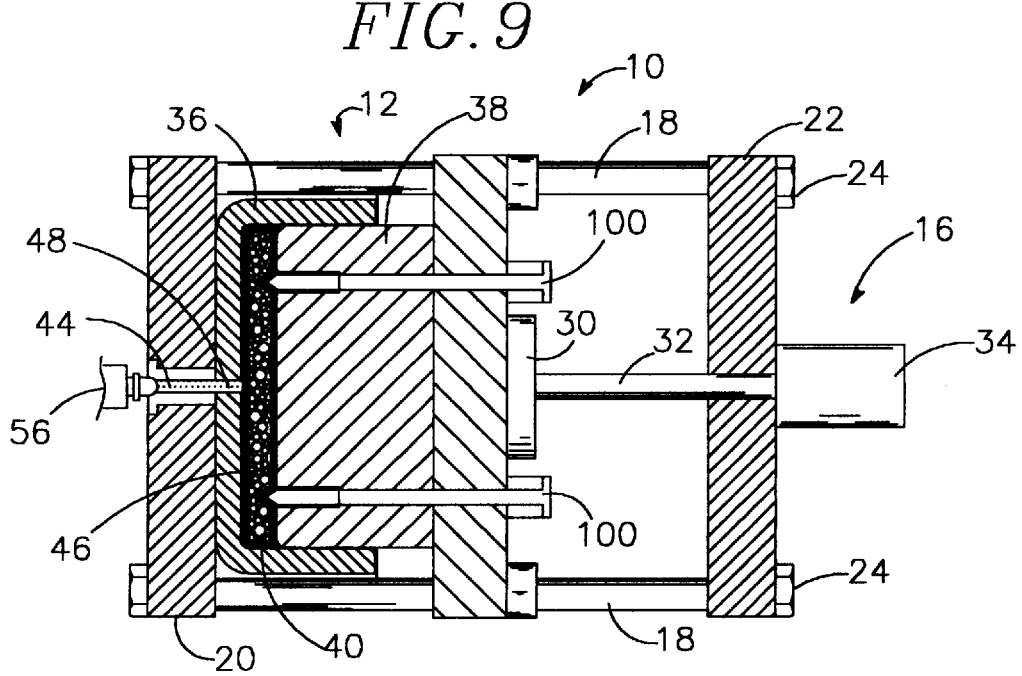
FIG. 9 is an elevational view of the mold apparatus used to make plastic articles having grooves on one side.
Figure 10:
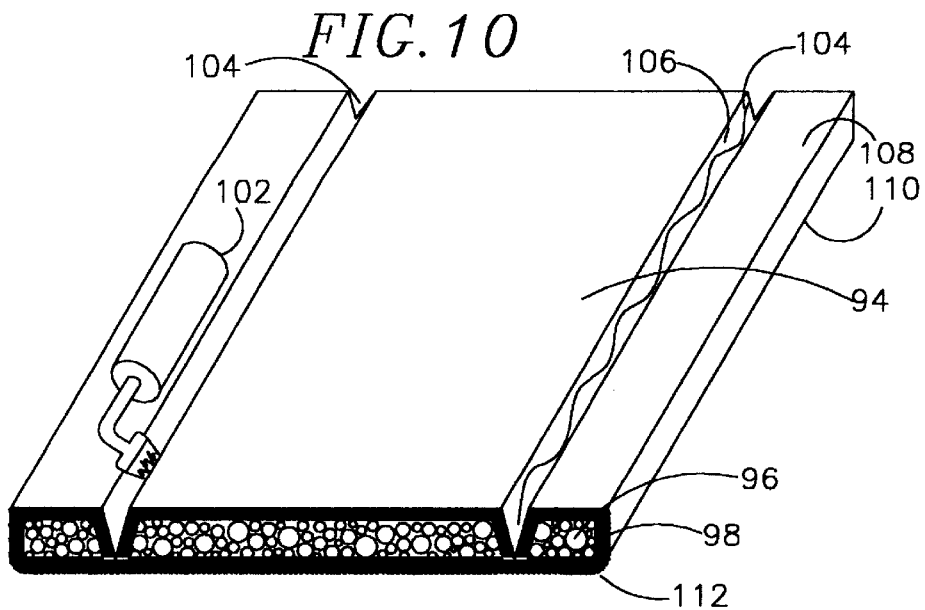
FIG. 10 is a cross-sectional perspective view of a finished plastic article having grooves on one side.
Figure 11A:
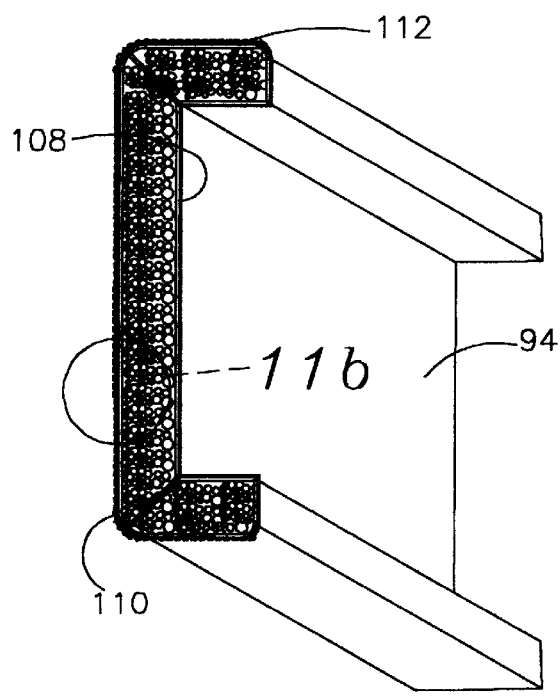
FIGS. 11a–b are a cross-sectional perspective view and detail of the finished plastic article of FIG. 10 after it has been bent.
Figure 11B:
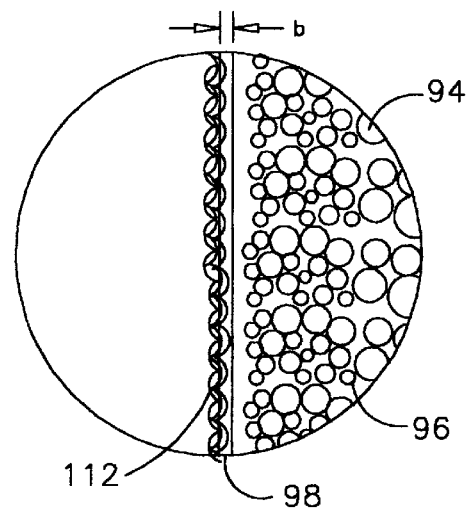

In order to form a plastic article 94 that is a single flat sheet that is capable of being folded into a more complex shape (FIG. 10), the mold apparatus is equipped with extensible and retractable beveled cores 100 that extend into the mold cavity 40 (FIG. 9). In the preferred embodiment these beveled cores extend through the second mold section, however it is contemplated that they could be placed so that they extend through the first mold section. During the expansion of the mold cavity, as the second mold section 38 moves away from the first mold section 36, the beveled cores 100 extend so that they remain at a constant distance from the first molding surface 86. In the preferred embodiment this constant distance is the same as the desired skin thickness. These beveled cores form grooves 104 in a first side 108 of the plastic article 94. Although in the preferred embodiment the second side 110 of the plastic article 94 does not have any grooves, it is contemplated that grooves could be molded into either side. A heating means 102 such as a blow torch may be used to melt the plastic along the groove 104 so that when the article 94 is folded it will stick in the desired shape. Alternatively, an adhesive 106 (FIG. 10) may be used to hold the folded article 94 (FIG. 11*a*) in place. A fabric layer 112 may be molded into the outer skin 98 (FIG. 11*b*). Although in the preferred embodiment the grooves are formed during the molding process, it is contemplated that the grooves could be formed by removing material from the completed plastic article 94.

Figure 12:
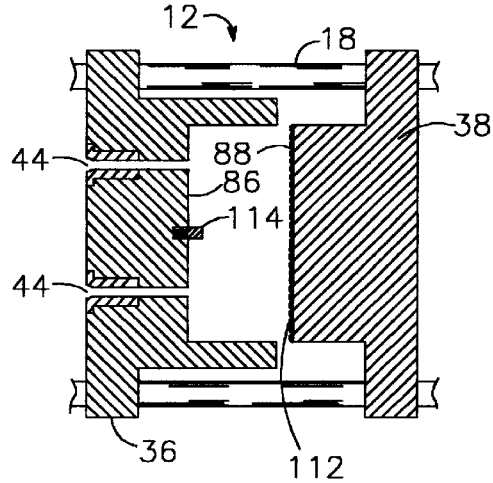
FIG. 12 is an elevational view of a mold apparatus in the open position used to make a plastic article having a laminar hinge.
Figure 13:
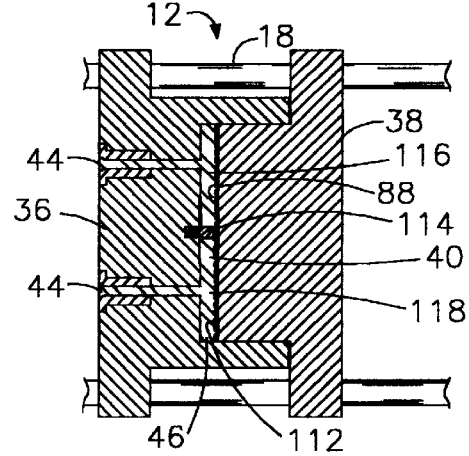
FIG. 13 is an elevational view of the mold apparatus of FIG. 12 in the initial position as the injection mixture is being injected into the mold cavity.
Figure 15A:
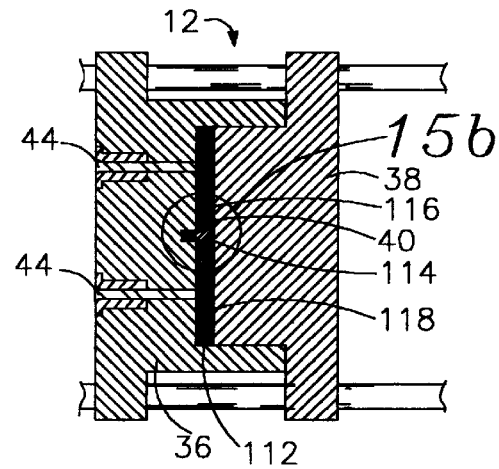
FIGS. 15a–b are an elevational view and close-up of the mold apparatus of FIG. 12 in the compressed position.

Fabric can be molded into the unfoamed skin 98 for extra support, for aesthetic reasons, or to form a fabric hinge 122 between two plastic sections 120. To mold fabric 112, or any sort or deformable lamina into the unfoamed skin 98, the lamina 112 is placed in the mold cavity 40 before injecting the injection mixture 46 into the mold cavity 40 (FIG. 12). As the plastic article 94 is formed, the fabric 112 becomes integrated with the injection material near the second molding surface (FIGS. 11*b*, 15*b*).

Figure 14A:
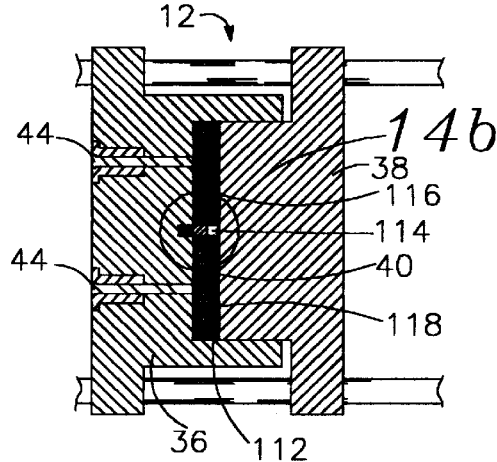
FIGS. 14a–b are an elevational view and close-up of the mold apparatus of FIG. 12 in the expanded position.
Figure 14B:
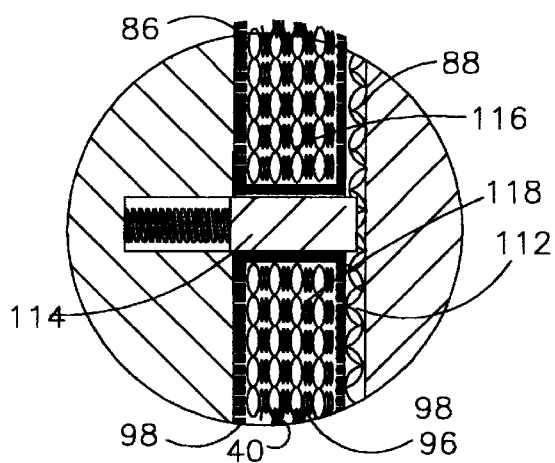
Figure 15B:
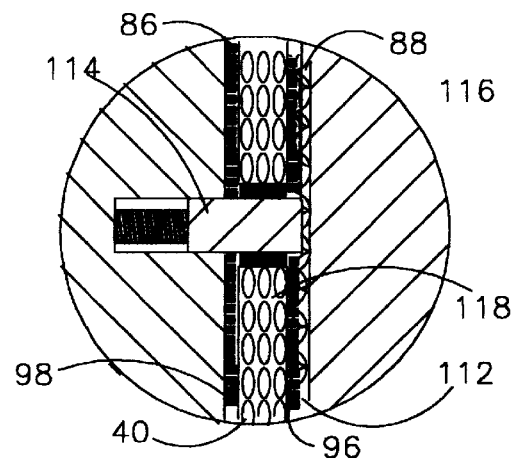

As best seen in FIGS. 14*b* and 15*b*, the compression step sets the fabric 112 in the unfoamed outer skin 98. This gives the plastic improved adhesion with the fabric 112, and forms a flat uniform surface. Without the compression step, the injection mixture 46 would not fully impregnate the fabric 112. The insulating properties of the fabric between the molding surface 88 and the injection mixture 46 may require a longer skin-forming interval be used for parts having fabric 112 bonded into the outer skin 98.

Figure 16:
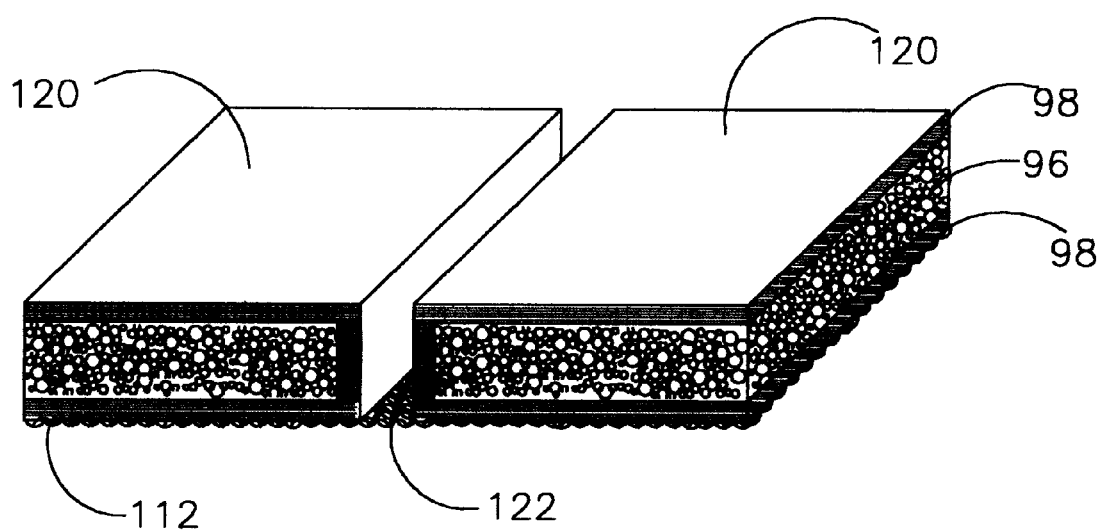
FIG. 16 is a perspective view of a plastic article formed by the present invention and having a fabric hinge.

In molding in a fabric hinge 122, a mold unit 12 having two nozzle inlets 44 is used (FIGS. 12–15). An extensible plug 114 is seated in the first mold section to divide the mold cavity into a first mold chamber 116 and a second mold chamber 118. A single sheet of fabric 112 extends across both mold chambers 116, 118. During the expansion, the extensible plug extends to continue to divide the mold cavity 40 into two mold chambers 116, 118. The finished plastic article 94 has two plastic sections 120, each having a foamed interior 96 and an unfoamed outer skin 98 of a desired thickness "b" (FIG. 16). The single sheet of fabric is integrated with the unfoamed outer skin 98 of each plastic section. The sheet of fabric provides a flexible connection between the two plastic sections that is suitable for use as a hinge 122.

In the preferred embodiment, the expanded volume is in the range of 200–400% of the volume of the mold cavity 40 before releasing the pressure and moving the second mold section 38 to the expanded volume position. The compression volume is in the range of 30–70% of the expanded volume.

By controlling and monitoring the injection temperature, the rate of injection, the pressure of the injection material, and the timing and rate of the expansion and compression of the mold sections; a plastic article 94 with a foamed interior and a dense outer skin 98 of a desired thickness can be produced. Once these factors are determined for a given plastic article 94, the article 94 can be consistently reproduced with the same dimensions and same skin thickness. The skin thickness can be varied by changing the above factors.

The foregoing description and drawings merely explain and illustrate the invention, and the invention is not limited thereto, except insofar as the claims are so limited as those skilled in the art who have the disclosure before them will be able to make modifications and variations therein without departing from the scope of the invention. For example, while the preferred embodiments show use of a horizontal mold apparatus 10, it is contemplated that a vertical mold apparatus could be used.

What is claimed is:

1. A method of controlling the thickness of an unfoamed outer skin of a foamed plastic article formed within an injection molding process, said method comprising:
   a. providing a mold unit, said mold unit comprising a first mold section and a second mold section, said first mold section and said second mold section forming a mold cavity upon being clamped together;
   b. providing a plastic injection material;
   c. providing a central processing unit, said central processing unit in operable communication with said mold unit, said central processing unit capable of controlling the volume of said mold cavity;
   d. selecting a triggering delay time, said triggering delay time corresponding to a time required to form said unfoamed outer skin to a desired thickness for a selected set of operating conditions;
   e. providing said triggering delay time to said central processing unit;
   f. clamping said first mold section and said second mold section together thereby forming said mold cavity;
   g. injecting said plastic injection material into said mold cavity thereby substantially filling said mold cavity; and
   h. controlling said thickness of said unfoamed outer skin by maintaining the volume of said mold cavity substantially constant for a period of time equal to said triggering delay time.

2. The method, according to claim 1, wherein said plastic injection material is compressed.

3. The method, according to claim 2, wherein said compression of said plastic injection material is accomplished by moving said second mold section to a compressed position, and wherein said second mold section is moved into said compressed position at a predetermined compression rate.

4. The method, according to claim 1, said method further comprising:

i) providing that said first mold section further comprises a first molding surface, and that said second mold section further comprises a second molding surface;
   ii) mixing said plastic injection material with a blowing agent prior to injecting said injection material;
   iii) maintaining said injection material at a pressure high enough to prevent said blowing agent from being activated during said step of controlling said thickness of said unfoamed outer skin;
   iv) cooling said injection material closest to said first and said second molding surfaces to a temperature below an activation temperature of said blowing agent during said step of controlling said thickness of said unfoamed outer skin;
   v) immediately following forming said unfoamed outer skin increasing the volume of said mold cavity to an expanded volume, thereby causing said injection material to expand by decreasing the pressure on said injection material such that said blowing agent is activated within a remaining portion of said injection material which has not cooled below said activation temperature;
   vi) maintaining said mold cavity at said expanded volume for a precise foaming interval; and
   vii) decreasing the volume of said mold cavity from said expanded volume to a compressed volume, thereby forming the plastic article having a foamed interior and an unfoamed outer skin of a precise desired thickness.

5. The method, according to claim 1, wherein said mold cavity is formed by a first mold section having a first molding surface and a second mold section having a second molding surface, wherein said first molding surface is at a predetermined first molding surface temperature when said injection process begins, and said second molding surface is at a predetermined second molding surface temperature when said injection process begins.

6. The method, according to claim 5, wherein at least one of said mold sections is equipped with cooling means to control a surface temperature of said molding section equipped with cooling means.

7. The method, according to claim 1, wherein said mold cavity is formed by a first mold section having a first molding surface and a second mold section having a second molding surface, wherein a deformable lamina is placed adjacent to at least one of said molding surfaces prior to injecting said injection material into said mold cavity, and wherein said deformable lamina becomes integrated with said unfoamed outer skin during the method.

8. The method, according to claim 7, wherein before injecting said injection material into said mold cavity, said mold cavity is divided into a plurality of mold chambers, and wherein said deformable lamina extends into each mold chamber.

9. The method according to claim 1, wherein the plastic article formed by the method has a first side and a second side, and wherein said first side is formed with at least one groove running the length of the article.

10. The method according to claim 9, wherein said groove extends to said outer skin on said second side of the plastic article.

11. The method, according to claim 1, wherein said selected set of operating conditions comprises an injection temperature, a rate of injection, an injection pressure, an expansion rate, and a mold section temperature.

12. The method, according to claim 11, further comprising holding said selected set of operating conditions substantially constant.

13. The method, according to claim 1, wherein said selected set of operating conditions is chosen from the group consisting of injection temperature, a rate of injection, an injection pressure, an expansion rate, and a mold section temperature.

14. A method of controlling the thickness of an unfoamed outer skin of a foamed plastic article formed within an injection molding process, said method comprising:

a. providing a mold unit, said mold unit comprising a first mold section and a second mold section, said first mold section and said second mold section forming a mold cavity upon being clamped together;

b. providing a plastic injection material;

c. providing a central processing unit, said central processing unit in operable communication with said mold unit, said central processing unit capable of controlling the volume of said mold cavity;

d. providing a delay time to said central processing unit, said delay time corresponding to a time required to form said unfoamed outer skin to a desired thickness;

e. clamping said first mold section and said second mold section together thereby forming said mold cavity;

f. injecting said plastic injection material into said mold cavity thereby substantially filling said mold cavity;

g. controlling said thickness of said unfoamed outer skin by maintaining the volume of said mold cavity substantially constant for a period of time equal to said delay time; wherein said mold cavity is formed by a first mold section having a first molding surface and a second mold section having a second molding surface, wherein a deformable lamina is placed adjacent to at least one of said molding surfaces prior to injecting said injection material into said mold cavity, and wherein said deformable lamina becomes integrated with said unfoamed outer skin during the method; and wherein before injecting said injection material into said mold cavity, said mold cavity is divided into a plurality of mold chambers, and wherein said deformable lanina extends into each mold chamber.

15. A method of controlling the thickness of an unfoamed outer skin of a foamed plastic article formed within an injection molding process, said method comprising:

a. providing a mold unit, said mold unit comprising a first mold section and a second mold section, said first mold section and said second mold section forming a mold cavity upon being clamped together;

b. providing a plastic injection material;

c. providing a central processing unit, said central processing unit in operable communication with said mold unit, said central processing unit capable of controlling the volume of said mold cavity;

d. providing a delay time to said central processing unit, said delay time corresponding to a time required to form said unfoamed outer skin to a desired thickness;

e. clamping said first mold section and said second mold section together thereby forming said mold cavity;

f. injecting said plastic injection material into said mold cavity thereby substantially filling said mold cavity; and g. controlling said thickness of said unfoamed outer skin by maintaining the volume of said mold cavity substantially constant for a period of time equal to said delay time;

wherein the plastic article formed by the method has a first side and a second side, and wherein said first side is formed with at least one groove running the length of the article.

16. The method according to claim 15, wherein said groove extends to said outer skin on said second side of the plastic article.

* * * * *